Patented Nov. 27, 1928.

1,692,854

UNITED STATES PATENT OFFICE.

WILFRED M. MURCH, OF HAMBURG, NEW YORK, ASSIGNOR TO NATIONAL ANILINE & CHEMICAL CO., INC., OF NEW YORK, N. Y., A CORPORATION OF NEW YORK.

PRODUCTION OF ANTHRAQUINONE COLORING MATTERS.

No Drawing. Application filed April 2, 1926. Serial No. 99,405.

This invention relates to the production of anthraquinone coloring matters more particularly N-dihydro-1.2.1'.2'-anthraquinonazine, by a fusion process.

In the production of anthraquinone coloring matters by the action of fused caustic alkali on aminoanthraquinone bodies or their derivatives, it has heretofore been common practice to carry out the reaction in cast iron or in steel vessels. Such a procedure often introduces undesirable quantities of iron into the melt which requires that the final product be subsequently subjected in most, if not all, cases to a purification process for the removal of iron. For example in the production of the blue coloring matter N-dihydro-1.2.1'.2'-anthraquinonazine by the action of fused caustic potash on 2-aminoanthraquinone in a cast-iron or steel pot, and particularly if the reaction is carried out in the presence of an oxidizing agent, the melt is almost invariably contaminated with quantities of iron, and the dyeings of the final dyestuff on cotton are dull and of undesirable shades. The ordinary and well-known hydrosulfite purification of the melt or of the final product is of little value unless they have been previously subjected to an acid treatment to remove the iron.

According to the present invention, anthraquinone coloring matters which are substantially free from iron, and which give bright dyeings of desirable shade, can be produced by subjecting aminoanthraquinone bodies to the action of caustic alkali in nickel-iron or nickel-steel vessels. The invention particularly contemplates the production of N-dihydro-1.2.1'.2'-anthraquinonazine, hereinafter called indanthrene, substantially free from iron, and giving bright dyeings of a desirable shade, by carrying out the reaction of fused caustic potash on 2-aminoanthraquinone in nickel-steel vessels, and particularly where an oxidizing agent is employed in the reaction. By carrying out the fusion in such vessels, a dyestuff giving bright dyeings is obtained, and a purification of the melt or the final product for the removal of metallic impurities is not necessary.

Nickel iron alloys of wide variations in composition may be employed, but a nickel steel which contains about 3 to 4 percent nickel, and about 0.1 to 0.25 percent each of chromium, manganese and silicon; is particularly advantageous. The stirrer or agitator employed is also preferably made of nickel steel.

The invention will be further illustrated by the following example, but it will be understood that it is not limited thereto. The parts are by weight.

Example: 60 parts of caustic potash (which contain about 4 to 6 percent water) is fused in a nickel-steel pot and to the well stirred molten potash maintained at a temperature of about 200°–230° C. there is added 17 parts of 2-amino-anthraquinone (about 90 percent pure) in the form of a slurry in admixture with about 15–20 parts of alcohol. The slurry is added at a rate such that excessive foaming is avoided. After the slurry has been all added, the temperature of the fused mass being about 230° C., there is then added about 2 parts of powdered potassium chlorate at such a rate that the temperature does not rise above 240° C. The mass is then heated and maintained at a temperature of about 250° C. for about thirty minutes. The resulting mass is then dissolved in about 1200 parts water containing sodium hydrosulfite and the leuco-dyestuff which crystallizes out is filtered off, suspended in water and oxidized to the dyestuff by means of a current of air in any suitable or well known manner. When the oxidation is complete, the dyestuff is filtered off and dried or made into a paste of suitable strength.

Both the melt and the final dyestuff thus obtained are substantially free from iron and give bright dyeings of desirable blue shades. The purification of the melt by crystallization of the leuco-dyestuff from a hydrosulfite solution is ordinarily employed for the primary purpose of removing certain undesirable organic impurities which may be present and may be omitted if desired.

In the above example, the use of an alcoholic slurry of 2-aminoanthraquinone has been found advantageous in that it quickly mixes with the fused potash whereas the dry 2-aminoanthraquinone fails to do so readily. In this way, superficial action is considerably avoided and the yield of dyestuff, as well as its purity, increased. Methyl, ethyl and other alcohols may be used.

In an analogous manner, other aminoanthraquinone bodies may be fused with caustic alkali in nickel-steel or nickel-iron pots.

I claim:

1. In the production of an anthraquinone coloring matter by inducing a reaction between caustic alkali and an aminoanthraquinone body, the improvement which comprises conducting the reaction in a nickel iron vessel.

2. In the production of an anthraquinonazine coloring matter by fusing a mixture of caustic potash, potassium chlorate and 2-aminoanthraquinone, the improvement which comprises conducting the reaction in a nickel steel vessel.

3. In the production of an anthraquinone coloring matter by fusing caustic potash and 2-aminoanthraquinone in the presence of an oxidizing agent, the improvement which comprises conducting the reaction in a nickel steel vessel.

4. In the process of making an anthraquinone coloring matter by fusing 2-amino-anthraquinone with caustic potash, the improvement which comprises introducing an alcoholic slurry of 2-aminoanthraquinone into molten caustic potash in a nickel steel vessel.

5. In the process of making N-dihydro-1.2.1'.2-anthraquinonazine by a fusion process the improvement which comprises fusing caustic potash, in a nickel iron vessel, introducing an alcoholic slurry of 2-aminoanthraquinone into the fused caustic potash, subsequently introducing potassium chlorate into the fused mixture, and completing the reaction in said nickel iron vessel.

6. In the production of an anthraquinone coloring matter by a process comprising fusing caustic alkali and an aminoanthraquinone body, the improvement which comprises conducting the reaction in a nickel iron vessel, said vessel containing about 3 to 4 percent of nickel in its composition.

7. In the process of producing an anthraquinone coloring matter by fusing 2-aminoanthraquinone and caustic potash in the presence of an oxidizing agent, the improvement which comprises conducting the reaction in a nickel steel vessel, said vessel containing about 3 to 4 percent nickel, and about 0.1 to 0.25 percent each of chromium manganese and silicon in its composition.

In testimony whereof I affix my signature.

WILFRED M. MURCH.

CERTIFICATE OF CORRECTION.

Patent No. 1,692,854.            Granted November 27, 1928, to

WILFRED M. MURCH.

It is hereby certified that error appears in the printed specification of the above numbered patent requiring correction as follows: Page 2, line 30, claim 5, for the second numeral "2" read "2 prime"; and that the said Letters Patent should be read with this correction therein that the same may conform to the record of the case in the Patent Office.

Signed and sealed this 15th day of January, A. D. 1929.

(Seal)

M. J. Moore,
Acting Commissioner of Patents.

anthraquinone bodies may be fused with caustic alkali in nickel-steel or nickel-iron pots.

I claim:

1. In the production of an anthraquinone coloring matter by inducing a reaction between caustic alkali and an aminoanthraquinone body, the improvement which comprises conducting the reaction in a nickel iron vessel.

2. In the production of an anthraquinonazine coloring matter by fusing a mixture of caustic potash, potassium chlorate and 2-aminoanthraquinone, the improvement which comprises conducting the reaction in a nickel steel vessel.

3. In the production of an anthraquinone coloring matter by fusing caustic potash and 2-aminoanthraquinone in the presence of an oxidizing agent, the improvement which comprises conducting the reaction in a nickel steel vessel.

4. In the process of making an anthraquinone coloring matter by fusing 2-amino-anthraquinone with caustic potash, the improvement which comprises introducing an alcoholic slurry of 2-aminoanthraquinone into molten caustic potash in a nickel steel vessel.

5. In the process of making N-dihydro-1.2.1'.2-anthraquinonazine by a fusion process the improvement which comprises fusing caustic potash, in a nickel iron vessel, introducing an alcoholic slurry of 2-aminoanthraquinone into the fused caustic potash, subsequently introducing potassium chlorate into the fused mixture, and completing the reaction in said nickel iron vessel.

6. In the production of an anthraquinone coloring matter by a process comprising fusing caustic alkali and an aminoanthraquinone body, the improvement which comprises conducting the reaction in a nickel iron vessel, said vessel containing about 3 to 4 percent of nickel in its composition.

7. In the process of producing an anthraquinone coloring matter by fusing 2-aminoanthraquinone and caustic potash in the presence of an oxidizing agent, the improvement which comprises conducting the reaction in a nickel steel vessel, said vessel containing about 3 to 4 percent nickel, and about 0.1 to 0.25 percent each of chromium manganese and silicon in its composition.

In testimony whereof I affix my signature.

WILFRED M. MURCH.

CERTIFICATE OF CORRECTION.

Patent No. 1,692,854.     Granted November 27, 1928, to

WILFRED M. MURCH.

It is hereby certified that error appears in the printed specification of the above numbered patent requiring correction as follows: Page 2, line 30, claim 5, for the second numeral "2" read "2 prime"; and that the said Letters Patent should be read with this correction therein that the same may conform to the record of the case in the Patent Office.

Signed and sealed this 15th day of January, A. D. 1929.

(Seal)

M. J. Moore,
Acting Commissioner of Patents.